US012728909B2

(12) United States Patent
de Paula et al.

(10) Patent No.: US 12,728,909 B2
(45) Date of Patent: Sep. 8, 2026

(54) STEERING MECHANISM FOR STEER BY WIRE VEHICLE

(71) Applicant: Schaeffler Technologies AG & Co. KG, Herzogenaurach (DE)

(72) Inventors: Renato de Paula, Sterling Heights, MI (US); Renato de Oliveira Ghiraldi, Royal Oak, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 468 days.

(21) Appl. No.: 18/232,402

(22) Filed: Aug. 10, 2023

(65) Prior Publication Data

US 2025/0050939 A1 Feb. 13, 2025

(51) Int. Cl.
*B62D 5/04* (2006.01)

(52) U.S. Cl.
CPC ......... *B62D 5/0421* (2013.01); *B62D 5/0448* (2013.01)

(58) Field of Classification Search
CPC .. B62D 5/0421; B62D 5/0448; B62D 5/0445; B62D 5/0424
USPC .......................................................... 180/444
See application file for complete search history.

(56) References Cited

U.S. PATENT DOCUMENTS 3,753,378 A 8/1973 Bishop
4,444,070 A 4/1984 Yanai
RE32,222 E 8/1986 Drutchas
4,619,155 A 10/1986 Futaba
5,020,616 A 6/1991 Yagi et al.
6,915,874 B2 7/2005 Tatewaki et al.
10,899,380 B2 1/2021 Augustine
2017/0158221 A1 6/2017 Yamamoto
2019/0300045 A1* 10/2019 Bader .................... B21K 1/767
2019/0329816 A1* 10/2019 Ko ....................... B62D 5/0424
2019/0351932 A1 11/2019 Washnock et al.
2020/0172155 A1* 6/2020 Augustine ............ B62D 5/0448
2020/0189218 A1* 6/2020 Fragoso ................ B23P 21/006
2020/0262470 A1* 8/2020 Kondo ................. B62D 5/0448
2020/0265247 A1 8/2020 Musk et al.
2021/0291891 A1 9/2021 Hauser et al.
2021/0394818 A1* 12/2021 Zinnecker ................ B62D 3/08
2022/0048561 A1 2/2022 Raither et al.

FOREIGN PATENT DOCUMENTS

CN 216690096 U * 6/2022
DE 102009039164 A1 6/2010
DE 102016206564 A1 10/2017
DE 102017103975 A1 8/2018
DE 102017103976 A1 8/2018
DE 102019209930 A1 1/2021
DE 102021201267 A1 8/2022
EP 0279034 B1 * 2/1993 ............... B62D 3/12
KR 102431451 B1 8/2022
WO WO-2021054681 A1 * 3/2021 ............ B62D 5/046

* cited by examiner

*Primary Examiner* — Valentin Neacsu
*Assistant Examiner* — Morgan Knauf

(57) ABSTRACT

A vehicle steering system is provided that includes a bar with threads and an anti-rotation section. An actuator having a ball nut configured to engage the threads of the bar such that the rotation of the ball nut moves the bar longitudinally along a bar axis to move one or more wheels of a vehicle. A sleeve is disposed on the anti-rotation section of the bar and non-rotatably engages the threads of the bar such that the bar is prevented from rotating about the bar axis.

20 Claims, 5 Drawing Sheets

STEERING MECHANISM FOR STEER BY WIRE VEHICLE

TECHNICAL FIELD

The disclosure relates to a vehicle steering mechanism for a steer by wire vehicle.

BACKGROUND

Steer by wire systems can eliminate physical connection between a steering wheel and the wheels of a car. Steer by wire systems often employ linear actuators that utilize electric motors and screw drives.

SUMMARY

An example embodiment of a vehicle steering system includes a bar, a housing, an actuator, and a sleeve. The bar is configured to move at least one wheel. The actuator has a ball nut configured to engage threads of the bar such that rotation of the ball nut moves the bar longitudinally along an actuation axis via the threads. A sleeve is disposed on an anti-rotation section of the bar and is configured to engage the threads of the bar such that the bar is prevented from rotating about the actuation axis. The anti-rotation section and the sleeve move or reciprocate in unison within the housing. The sleeve can be constructed from plastic and include a flat that slidably engages a flat of the housing to prevent rotation of: i) the sleeve relative to the housing, or ii) the sleeve relative to actuation axis.

In an example embodiment, the bar does not have gear teeth.

In an example embodiment, the sleeve is a two-piece hinged sleeve configured to snap together.

In an example embodiment, the sleeve includes a protrusion that engages a concave portion of one of the threads of the bar.

In an example embodiment, the threads of the bar are interrupted by a non-threaded portion such that the non-threaded portion has the threads extending from each side of the non-threaded portion, and the sleeve is arranged on the non-threaded portion.

In an example embodiment, the non-threaded portion has a circular profile.

In an example embodiment, the vehicle steering system includes an electric motor drivably connected to the ball nut.

In an example embodiment, the sleeve clamps onto the threads of the bar.

In an example embodiment, the sleeve non-rotatably grasps the threads of the bar such that the bar is prevented from rotating about the actuation axis.

In an example embodiment, at least a portion of the threads of the bar are disposed within the housing.

In an example embodiment, the sleeve and the bar move in unison together via the ball nut.

In an example embodiment, the sleeve includes a bore and a portion of the threads are disposed within the bore, and the bore cooperates with the threads to prevent rotation of the bar about the actuation axis.

In an example embodiment, the sleeve extends entirely around the bar.

In an example embodiment, the anti-rotation section and at least a portion of the threads of the bar are disposed within the housing, and the sleeve cooperates with the housing to prevent rotation of the sleeve and the bar about the actuation axis.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 7:
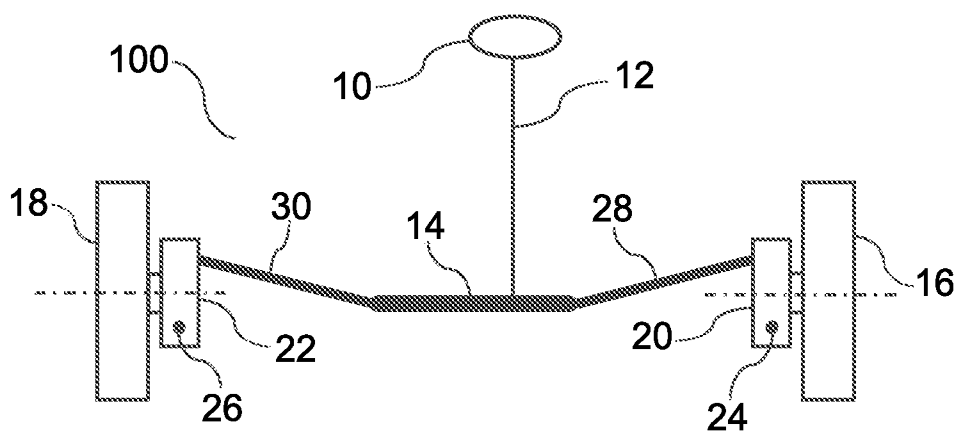
FIG. 7 is a top view of an example embodiment of a vehicle steering system shown while not turning.

FIG. 7 is a top view of a prior art vehicle steering system 100. A driver commands steering by rotating a steering wheel 10 connected to a shaft 12. This causes a bar 14 to translate. Left and right wheels 16 and 18 (viewed from driver's perspective) are supported for rotation with respect to left and right knuckles 20 and 22 respectively. Knuckles 20 and 22 are supported to pivot about vertical axes 24 and 26 respectively. The knuckles may be supported in a manner that allows vertical translation with respect to vehicle structure to improve ride quality. The knuckles are attached to the bar by connecting rods 28 and 30.

Figure 8:
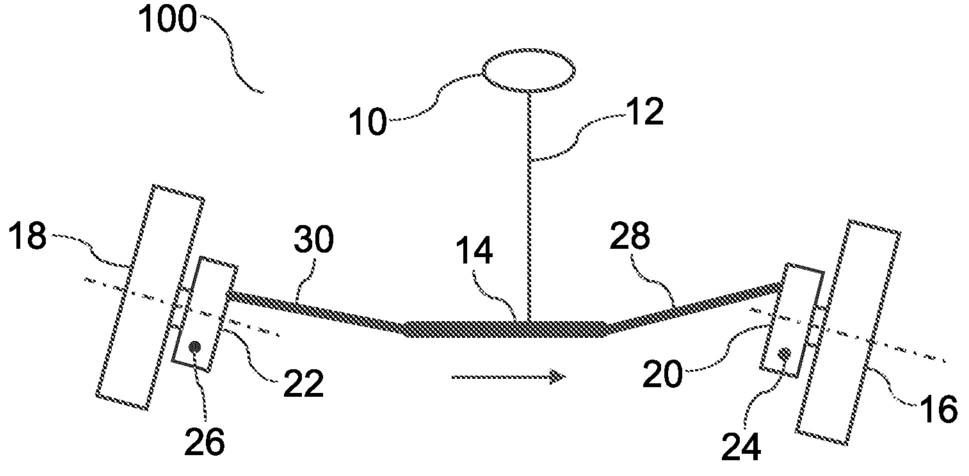
FIG. 8 is a top view of the vehicle steering system of FIG. 7 shown while turning.

FIG. 8 illustrates the condition of the prior art vehicle steering system 100 when the vehicle is turning. In response to rotation of the steering wheel 10, the bar 14 has translated toward the right wheel 16. The back part of right knuckle 20 has been pushed outward while the back part of the left knuckle 22 has been pulled inward. This has caused the knuckles to pivot and to re-orient the wheel axes.

Figure 9:
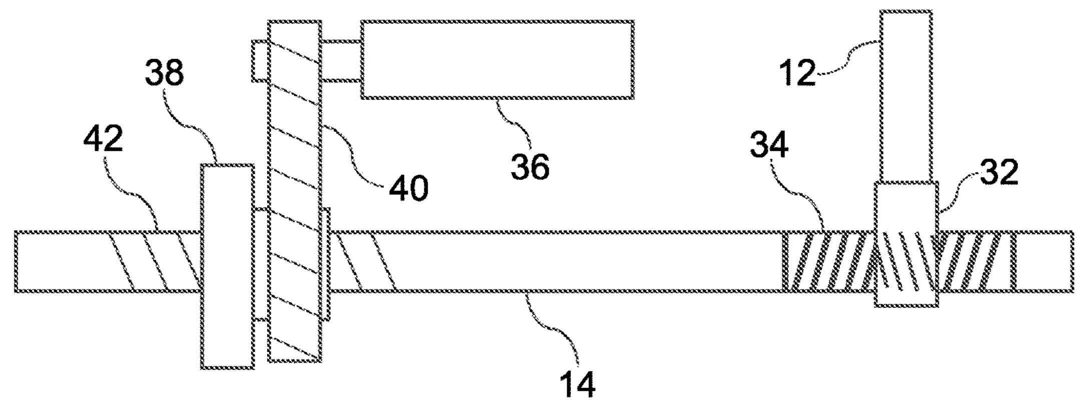
FIG. 9 is a top view of a portion of the vehicle steering system of FIG. 7.

FIG. 9 shows the actuator that links the bar 14 with the shaft 12. A pinion gear 32 fixed to the end of shaft 12 meshes with gear teeth 34 on a section of bar 14. (This toothed portion of the bar may be called a rack.) This meshing interface causes the bar 14 to translate in response to rotation of the pinion gear 32. An electric motor 36 provides assistance, reducing the effort required to turn the steering wheel. The electric motor 36 is drivably connected to a ball screw drive 38 by belt 40. Ball screw drive 38 interfaces with a threaded section 42 of the bar 14 such that bar 14 translates along an actuation axis 46 in response to rotation of ball screw drive 38 about the actuation axis 46. A controller commands the electric motor 36 to provide assistance in response to a torque sensor indicating torsion on shaft 12.

Figure 10:
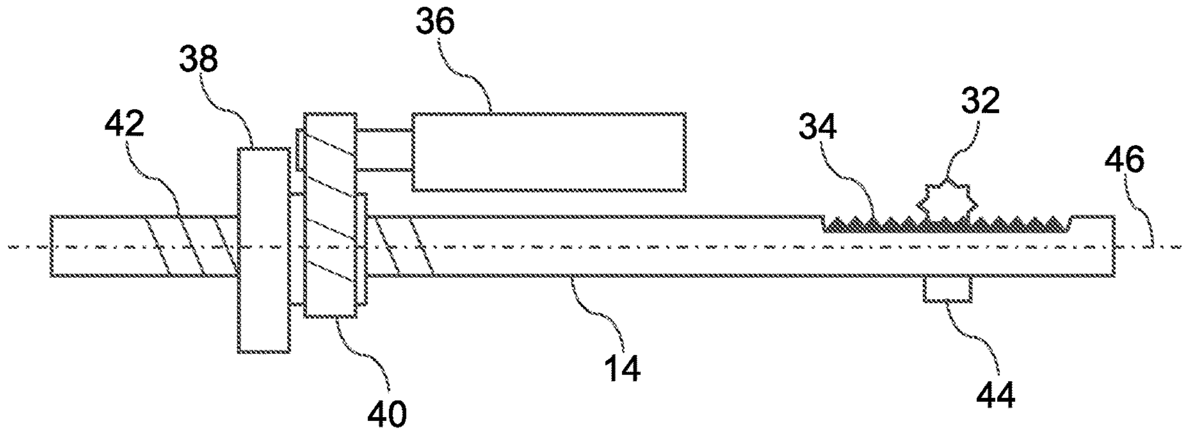
FIG. 10 is a front view of the portion of the vehicle steering system of FIG. 7.

FIG. 10 shows the actuator as seen from the front of the vehicle. A yoke 44 supports bar 14 opposite the pinion gear 32, preventing the toothed portion of the bar from translating downwardly or fore and aft. The pinion gear 32 prevents the toothed portion of the bar from translating upwardly. The pinion gear 32 and gear teeth 34 also prevent rotation of the bar 14 about the actuation axis 46, a tendency induced by the ball screw drive 38 on the bar 14.

Steer by wire vehicles are steered by a control unit as opposed to a human driver. Therefore, the steering wheel 10 and shaft 12 of the prior art steering system 100 of FIGS. 7-10 are not needed. In a steer by wire vehicle application, the electric motor 36 provides primary steering as opposed to merely an assist. In a steer by wire vehicle, the shaft 12, the pinion gear 32, gear teeth 34, and the yoke 44 may be omitted and the control unit directs the electric motor 36 in response to driver rotation of the steering wheel 10. However, omission of these components requires an alternative means of preventing rotation of the bar 14 about the actuation axis 46 as the bar 14 is moved via the electric motor 36 and ball screw drive 38.

Figure 1:
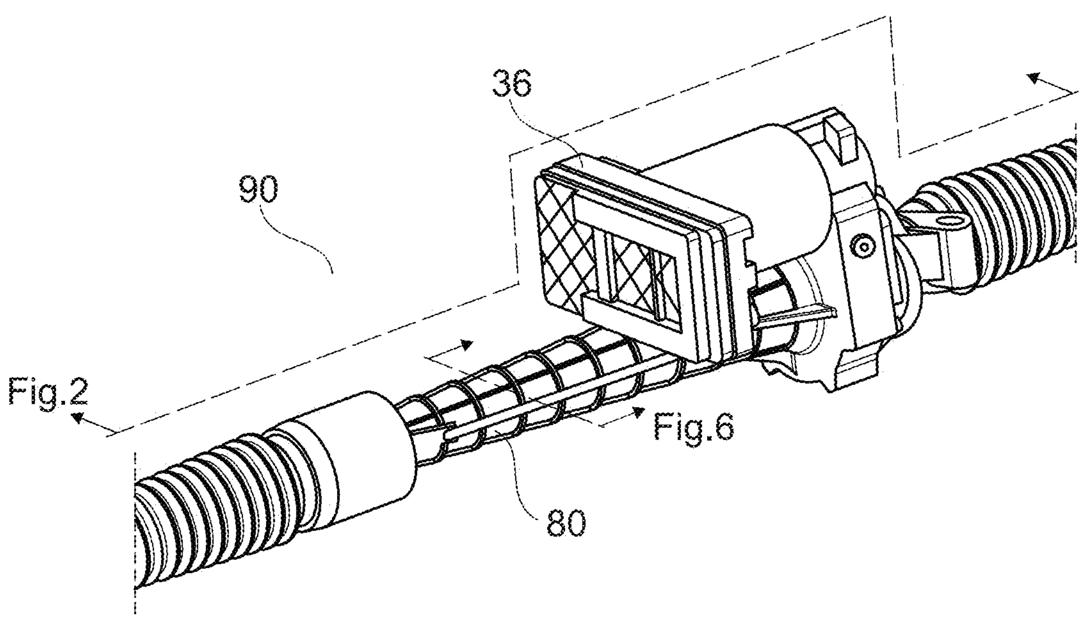
FIG. 1 is a perspective view of an example embodiment of a steering system actuator for a steer by wire vehicle.
Figure 2:
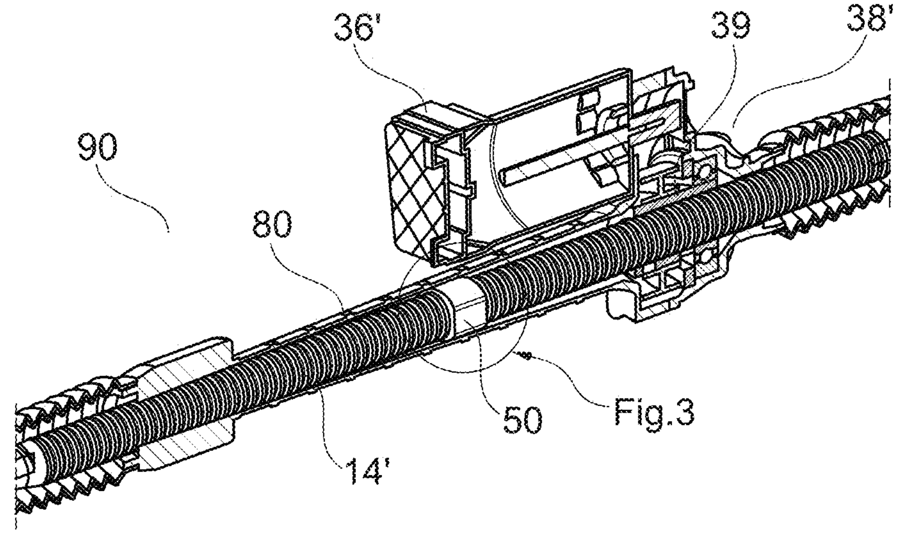
FIG. 2 is a partial cross-sectional view taken from FIG. 1.
Figure 3:
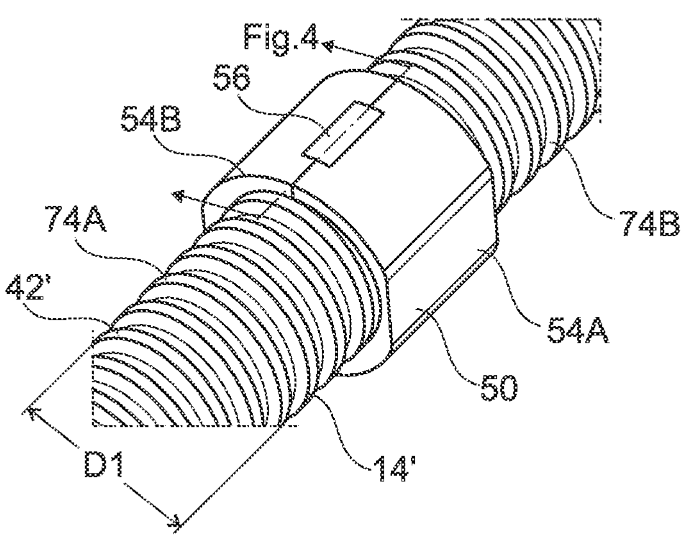
FIG. 3 is a detailed view taken from FIG. 2.
Figure 4:
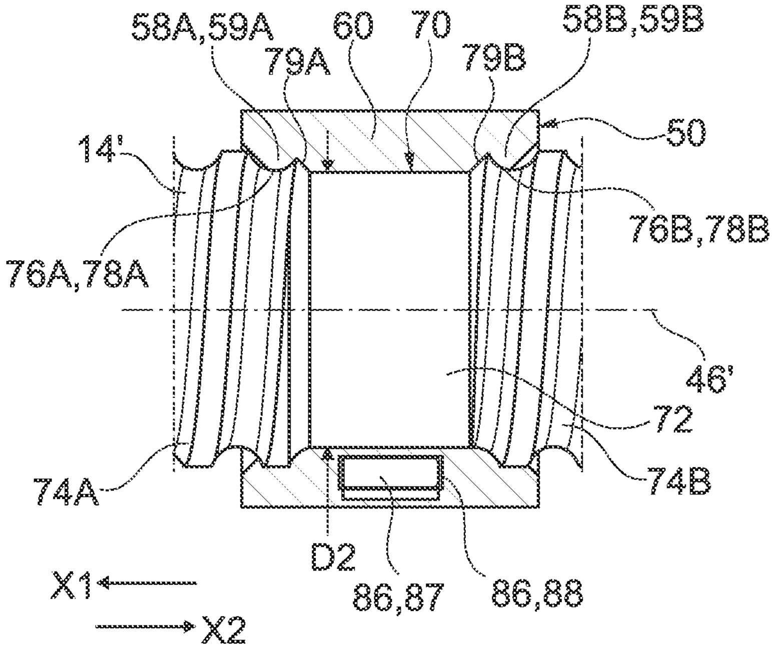
FIG. 4 is a cross-sectional view taken from FIG. 3 which shows a sectioned sleeve together with a non-sectioned bar.
Figure 5:
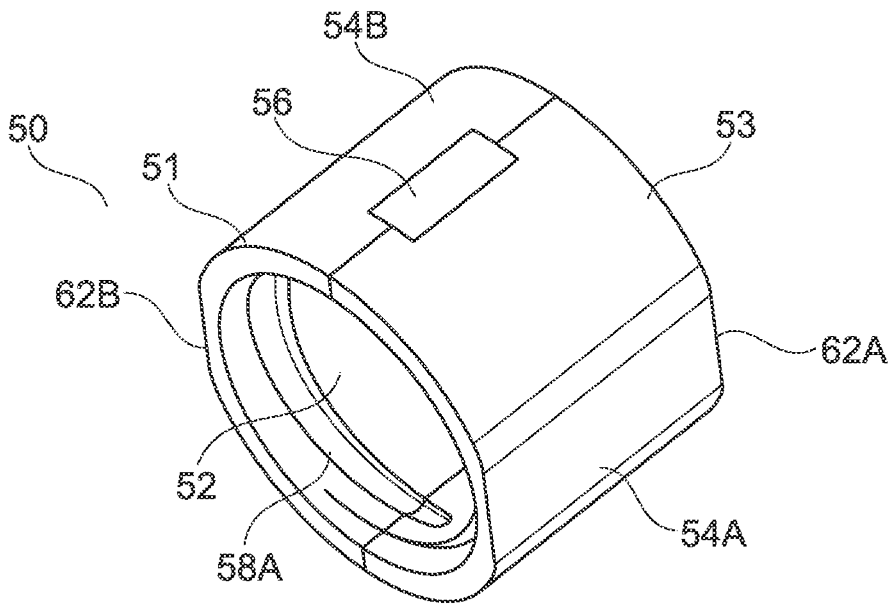
FIG. 5 is a perspective view of an example embodiment of a sleeve configured to prevent rotation of a bar of the vehicle steering system actuator of FIG. 1.
Figure 6:
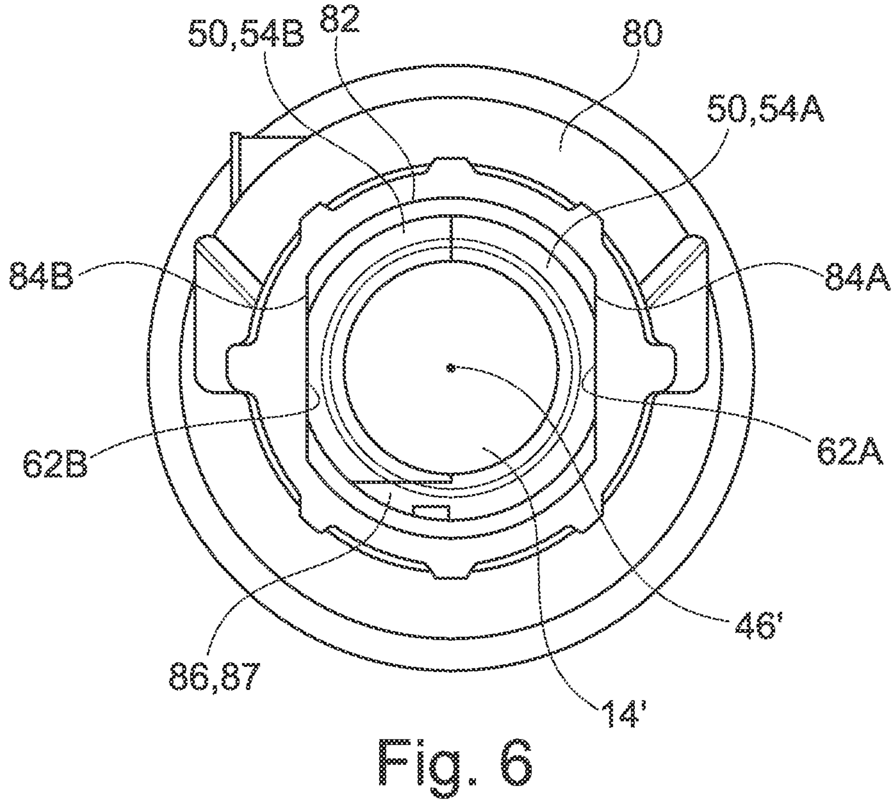
FIG. 6 shows a cross-sectional view taken from FIG. 1.

FIGS. 1-6 illustrate a steering system actuator 90 suitable for a steer by wire vehicle. Parts which are identical to corresponding parts in FIGS. 7-10 are labeled with the same reference number. Parts which are similar in function but not identical are labeled with a primed reference number. FIG. 1 shows a perspective view of the steering system actuator 90. FIG. 2 shows a partial cross-sectional view taken from FIG. 1. FIG. 3 shows a detailed view taken from FIG. 2. FIG. 4 is a cross-sectional view taken from FIG. 3 which shows a sectioned sleeve 50 together with a non-sectioned bar 14'. FIG. 5 shows a perspective view of the sleeve 50 that is utilized for rotation prevention of the bar 14' of the steering system actuator 90 about the actuation axis 46. FIG. 6 shows a cross-sectional view taken from FIG. 1. The following should be read in light of FIGS. 1 through 6.

The steering system actuator 90 includes an electric motor 36' that linearly actuates a bar 14' via a ball nut 39 (or threaded nut) of a ball screw drive 38'. A large portion of the bar 14' is disposed within and reciprocates within a bore 82 of a housing 80. The ball screw drive 38' also resides within the housing 80. A sleeve 50 is installed or arranged on an anti-rotation section 70 of the bar 14' to prevent rotation of the bar 14' about the actuation axis 46' as it translates linearly along the actuation axis 46'. Therefore, the sleeve 50 does not include gear teeth that engage with a pinion gear to accomplish this rotation-prevention task. The anti-rotation section 70 of the bar 14 resides within the housing 80 and includes a non-threaded portion 72 that interrupts the threaded section 42' of the bar which results in a first threaded portion 74A and a second threaded portion 74B. It could be stated that the first threaded portion 74A and the second threaded portion 74B flank the non-threaded portion 72 in an axial direction relative to the actuation axis 46'. Furthermore, it could also be stated that threads extend from each side of the non-threaded portion 72.

The sleeve 50 non-rotatably engages the anti-rotation section 70 of the bar 14'. The term non-rotatably is meant to signify that the sleeve 50 engages the bar 14' in a such a way where rotation does not occur between the sleeve 50 and the bar 14'; alternatively stated, the sleeve is rotationally fixed to the anti-rotation section 70 of the bar 14'. Furthermore, the sleeve 50 is also axially fixed to the anti-rotation section 70 of the bar 14'. The features of the sleeve 50 and the bar 14' will now be described which facilitate the rotational and axial fixing of the sleeve 50 to the bar 14'.

The sleeve 50 includes a first piece 54A and a second piece 54B that can be fixed or locked to the first piece 54A via an exemplary lock 86 shown in FIGS. 4 and 6. The lock 86 includes a protrusion 87 that integrally extends from the first piece 54A into an aperture 88 of the second piece 54B such that the aperture snaps into the aperture 88 to fix the first and second pieces 54A, 54B together. Several other suitable lock designs are also possible that facilitate a fixing of the two pieces together.

In an example embodiment, the sleeve 50 is constructed of plastic, however, any suitable material could be used. Furthermore, the sleeve 50 could also utilize insert molding or overmolding technologies. The sleeve 50 could be described as a clamshell type sleeve that wraps or extends entirely around the anti-rotation section 70 of the bar 14' via a hinge 56 that connects the first and second pieces 54A, 54B to each other. In an example embodiment, the hinge 56 continuously connects the first and second pieces 54A, 54B to each other. The hinge 56 facilitates an opening of the sleeve 50 that is greater than a diameter D1 of the bar 14' so that the sleeve 50 can be installed on the bar 14'. The sleeve 50 defines a bore 52 into which the bar 14' is disposed. Furthermore, it could be stated that the bar 14' extends through the bore 52. In an example embodiment, the sleeve grasps or clamps onto the anti-rotation section 70 of the bar 14' to provide fixation to the bar 14' without slippage. Therefore, the sleeve 50 forcibly attaches itself onto the anti-rotation section 70 of the bar 14'.

The bore 52 of the sleeve 50 includes a first protrusion 58A at a first end 51 of the sleeve 50 and a second protrusion 58B at a second end 53 of the sleeve 50. In an example embodiment, the first and second protrusions 58A, 58B can extend helically, like that of a thread, so that the first protrusion 58A engages (or clamps onto, or grasps) a first concave portion 76A of the first threaded portion 74A, and the second protrusion 58B engages (or clamps onto, or grasps) a second concave portion 76B of the second threaded portion 74B. The first concave portion 76A can be that of a first helical thread 78A of the first threaded portion 74A and the second concave portion 76B can be that of a second helical thread 78B of the second threaded portion 74B. Therefore, it could be stated that helical threads of the sleeve engage (or clamp onto, or grasp) helical threads of the bar 14'; or more specifically, a first thread 59A of the sleeve 50 engages a first helical thread 78A of the first threaded portion 74A of the bar 14', and a second thread 59B of the sleeve 50 engages a second helical thread 78B of the second threaded portion 74B of the bar 14'. Such thread engagement facilitates both rotational and axial fixation of the sleeve 50 to the bar 14'. The first helical thread 78A of the first threaded portion 74A and the second helical thread 78B of the second threaded portion 74B can be a part of the anti-rotation section 70 of the bar 14'.

The bore 52 of the sleeve includes a center axial portion 60 that is axially flanked by the first protrusion 58A (or first thread 59A) and the second protrusion 58B (or second thread 59B). The center axial portion 60 is circular and defined by a second diameter D2. The center axial portion 60 axially abuts with a first radially extending wall 79A of the first threaded portion 74A in a first axial direction X1 and axially abuts with a second radially extending wall 79B of the second threaded portion 74B in a second axial direction X2. This axial abutment between the center axial portion 60 and the first and second threaded portions 74A, 74B facilitates axial fixation of the sleeve 50 to the bar 14'.

Given the previously described axial and rotational fixation of the sleeve 50 to the bar 14', one can easily deduct that the sleeve 50 and the bar 14' move in unison as the bar 14' is linearly displaced in either of the first or second axial directions X1, X2 by the electric motor 36' via the ball nut 39 of the ball screw drive 38'. In order to facilitate rotation prevention of the bar 14' about the actuation axis 46', the sleeve 50 includes a first flat 62A and a second flat 62B that are configured to slidably engage a respective first housing flat 84A and a respective second housing flat 84B arranged within the bore 82 of the housing 80 during linear displacement of the bar 14' in both the first and second axial directions X1, X2. The first and second flats 62A, 62B of the sleeve 50 and the respective first and second housing flats 84A, 84B are configured in an opposed arrangement. The term "opposed" signifies that the flats are arranged opposite one another or 180 degrees apart. Any suitable number of flats on the sleeve 50 is possible, including only a single flat that corresponds with a single corresponding flat on the housing 80.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle steering system comprising:

a bar having threads and an anti-rotation section, the bar configured to move at least one wheel;

an actuator having a threaded nut configured to engage the threads of the bar such that rotation of the threaded nut moves the bar longitudinally along an actuation axis via the threads; and a sleeve disposed on the anti-rotation section and configured to non-rotatably engage the threads of the bar such that the bar is prevented from rotating about the actuation axis.

2. The vehicle steering system of claim 1, wherein the bar does not have gear teeth configured to mesh with a pinion gear.

3. The vehicle steering system of claim 1, wherein the sleeve is a two-piece sleeve.

4. The vehicle steering system of claim 1, wherein the sleeve is a two-piece hinged sleeve configured to snap together.

5. The vehicle steering system of claim 1, further comprising a housing and the anti-rotation section is disposed within the housing, and the sleeve includes a first flat configured to slidably engage a second flat of the housing to prevent rotation of the sleeve relative to the housing.

6. The vehicle steering system of claim 1, wherein the sleeve moves in unison with the bar.

7. The vehicle steering system of claim 1, wherein the sleeve includes a protrusion that engages within a concave portion of one of the threads of the bar.

8. The vehicle steering system of claim 1, wherein the sleeve is constructed from plastic.

9. The vehicle steering system of claim 1, wherein the threads of the bar are interrupted by a non-threaded portion such that the non-threaded portion has the threads extending from each side of the non-threaded portion, and the sleeve is arranged on the non-threaded portion.

10. The vehicle steering system of claim 9, wherein the non-threaded portion has a circular profile.

11. The vehicle steering system of claim 1, further comprising an electric motor drivably connected to the threaded nut.

12. The vehicle steering system of claim 1, wherein the sleeve clamps onto the threads of the bar.

13. A vehicle steering system comprising:

a bar having threads, the bar configured to move at least one wheel;

an actuator having a threaded nut configured to engage the threads of the bar such that rotation of the threaded nut moves the bar longitudinally along an actuation axis via the threads; and a sleeve disposed on the bar and configured to non-rotatably grasp the threads of the bar such that the bar is prevented from rotating about the actuation axis.

14. The vehicle steering system of claim 13, further comprising a housing and at least a portion of the threads is disposed within the housing, and the sleeve slidably engages the housing to prevent rotation of the sleeve and bar about the actuation axis.

15. The vehicle steering system of claim 14, wherein the sleeve includes a first flat configured to slidably engage a second flat of the housing to prevent rotation of the sleeve relative to the housing.

16. The vehicle steering system of claim 14, wherein the sleeve and bar move in unison together via the threaded nut.

17. A vehicle steering system comprising:

a bar having threads and an anti-rotation section that interrupts the threads such that the threads extend from each side of the anti-rotation section, the bar configured to move at least one wheel;

an actuator having a threaded nut configured to engage the threads of the bar such that rotation of the threaded nut moves the bar longitudinally along an actuation axis via the threads; and a sleeve having a bore, and the anti-rotation section and a portion of the threads are disposed within the bore, and the bore cooperates with the threads to prevent rotation of the bar about the actuation axis.

18. The vehicle steering system of claim 17, wherein the sleeve extends entirely around the bar.

19. The vehicle steering system of claim 18, further comprising a housing, and the anti-rotation section and at least a portion of the threads are disposed within the housing, and the sleeve cooperates with the housing to prevent rotation of the sleeve and the bar about the actuation axis.

20. The vehicle steering system of claim 17, wherein the sleeve and the bar move in unison together via the threaded nut.

* * * * *